US012570075B2

(12) United States Patent
Furuta et al.

(10) Patent No.: US 12,570,075 B2
(45) Date of Patent: Mar. 10, 2026

(54) TRANSPARENT RESIN FILM, DECORATIVE BOARD, AND METHOD FOR PRODUCING DECORATIVE BOARD

(71) Applicant: Dai Nippon Printing Co., Ltd., Tokyo (JP)

(72) Inventors: Satoshi Furuta, Tokyo (JP); Ryo Fujii, Tokyo (JP); Tomomi Nakajima, Tokyo (JP); Yoshiaki Netsu, Tokyo (JP); Toshinaru Kayahara, Tokyo (JP); Yosuke Sumida, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 17/283,733

(22) PCT Filed: Sep. 30, 2019

(86) PCT No.: PCT/JP2019/038611
§ 371 (c)(1),
(2) Date: Apr. 8, 2021

(87) PCT Pub. No.: WO2020/075565
PCT Pub. Date: Apr. 16, 2020

(65) Prior Publication Data
US 2021/0379873 A1      Dec. 9, 2021

(30) Foreign Application Priority Data

Oct. 12, 2018    (JP) ................................. 2018-193826
Mar. 27, 2019    (JP) ................................. 2019-060611

(51) Int. Cl.
*B32B 27/08*        (2006.01)
*B32B 3/30*         (2006.01)
(Continued)

(52) U.S. Cl.
CPC ................ *B32B 27/08* (2013.01); *B32B 3/30* (2013.01); *B32B 7/12* (2013.01); *B32B 21/02* (2013.01);
(Continued)

(58) Field of Classification Search
CPC .. B32B 27/08; B32B 3/30; B32B 7/12; B32B 21/02; B32B 21/08; B32B 27/32;
(Continued)

(56) References Cited

U.S. PATENT DOCUMENTS

2009/0246483 A1* 10/2009 Sugimura ............... B32B 27/32
                                                                            428/323
2016/0325535 A1    11/2016 Ueno et al.
(Continued)

FOREIGN PATENT DOCUMENTS

CN        102186670 A        9/2011
CN        103889723 A   *   6/2014   ............. B32B 33/00
(Continued)

OTHER PUBLICATIONS

Translation of JP10235771A (bib, description and claims). (Year: 1998).*
Translation of CN103889723A. (Year: 2014).*

*Primary Examiner* — Catherine A. Simone
(74) *Attorney, Agent, or Firm* — Troutman Pepper Locke LLP; James E. Armstrong, IV; Nicholas J. DiCeglie, Jr.

(57) ABSTRACT
The present invention provides a transparent resin film which enables visual check of the adhesion state after lamination of the transparent resin film on a picture layer provided on a substrate, a decorative board including the transparent resin film, and a method for producing the decorative board. Provided is a transparent resin film for protecting a picture layer provided on one side of a substrate,
(Continued)

the transparent resin film including at least: a thermoplastic resin layer; and an external haze layer on a picture layer side.

12 Claims, 1 Drawing Sheet

(51) Int. Cl.

| | |
|---|---|
| *B32B 7/12* | (2006.01) |
| *B32B 21/02* | (2006.01) |
| *B32B 21/08* | (2006.01) |
| *B32B 27/32* | (2006.01) |
| *B32B 37/12* | (2006.01) |
| *B32B 37/18* | (2006.01) |
| *E04F 13/08* | (2006.01) |

(52) U.S. Cl.
CPC .............. *B32B 21/08* (2013.01); *B32B 27/32* (2013.01); *B32B 37/12* (2013.01); *B32B 37/182* (2013.01); *E04F 13/0866* (2013.01); *E04F 13/0871* (2013.01); *B32B 2307/412* (2013.01); *B32B 2307/414* (2013.01); *B32B 2323/10* (2013.01); *B32B 2367/00* (2013.01); *B32B 2451/00* (2013.01)

(58) Field of Classification Search
CPC . B32B 37/12; B32B 37/182; B32B 2307/412; B32B 2307/414; B32B 2323/10; B32B 2367/00; B32B 2451/00; E04F 13/0866; E04F 13/0871
See application file for complete search history.

(56) References Cited

U.S. PATENT DOCUMENTS

| | | | |
|---|---|---|---|
| 2017/0009108 A1* | 1/2017 | Mitchell .................... C09J 7/29 |
| 2018/0022076 A1* | 1/2018 | Ueno ..................... B32B 27/36 |
| | | | 428/336 |

FOREIGN PATENT DOCUMENTS

| | | | |
|---|---|---|---|
| CN | 105960329 A | | 9/2016 |
| CN | 105992694 A | | 10/2016 |
| JP | H10-193536 A | | 7/1998 |
| JP | 10235771 A | * | 9/1998 |
| JP | 2003-291254 A | | 10/2003 |
| JP | 2005-120255 A | | 5/2005 |
| JP | 2009-192849 A | | 8/2009 |
| JP | 2010-049074 A | | 3/2010 |
| JP | 2018-31870 A | | 3/2018 |

* cited by examiner

TRANSPARENT RESIN FILM, DECORATIVE BOARD, AND METHOD FOR PRODUCING DECORATIVE BOARD

CROSS REFERENCE TO RELATED APPLICATIONS

This application is related to three co-pending applications: "DECORATIVE BOARD, TRANSPARENT RESIN FILM, AND DECORATIVE BOARD PRODUCTION METHOD" filed even date herewith in the names of Satoshi Furuta, Ryo Fujii, Tomomi Nakajima, Yoshiaki Netsu, Toshinaru Kayahara and Yosuke Sumida as a national phase entry of PCT/JP2019/038597; "TRANSPARENT RESIN FILM, DECORATIVE BOARD, AND METHOD FOR PRODUCING DECORATIVE BOARD" filed even date herewith in the names of Satoshi Furuta, Ryo Fujii, Tomomi Nakajima, Yoshiaki Netsu, Toshinaru Kayahara and Yosuke Sumida as a national phase entry of PCT/JP2019/038603; and "TRANSPARENT RESIN FILM, DECORATIVE BOARD, AND METHOD FOR PRODUCING DECORATIVE BOARD" filed even date herewith in the names of Ryo Fujii, Satoshi Furuta, Tomomi Nakajima, Yoshiaki Netsu, Toshinaru Kayahara and Yosuke Sumida as a national phase entry of PCT/JP2019/038606; which applications are assigned to the assignee of the present application and all three incorporated by reference herein.

TECHNICAL FIELD

The present invention relates to a transparent resin film, a decorative board including the transparent resin film, and a method for producing the decorative board.

BACKGROUND ART

A recent spread of ink-jet printing methods using inkjet printers has enabled production of decorative boards used for applications such as building materials or decorative molded articles of many kinds in small quantities and printing of complicated patterns (e.g., letters, numbers, and graphics) as picture layers.

The ink-jet printing methods advantageously enable printing not only on film substrates but also on substrates having flat surfaces, projections and depressions, and curved surfaces.

Since a picture layer prepared by an ink-jet printing method is typically provided on the outermost surface of the substrate, a transparent resin film is necessarily provided on a surface of the picture layer for the purpose of protecting the picture layer having insufficient surface properties such as scratch resistance, stain resistance, and weather resistance.

As such a transparent resin film, Patent Literature 1 discloses an overlaminate film including: a transparent polypropylene film containing a triazine ultraviolet absorber and a hindered amine light stabilizer; a protective layer on one side of the film; and an adhesive layer on the other side of the film.

However, when a conventional transparent resin film and a picture layer provided on a substrate is laminated on each other, it is difficult to visually determine whether or not air entrainment occurs between the picture layer on the substrate and the transparent resin film because air entrainment, if any, does not change the surface gloss so much. Moreover, adhesion between the picture layer and the transparent resin film is disadvantageously lowered when air entrainment occurs.

CITATION LIST

Patent Literature

Patent Literature 1: JP 2005-120255 A

SUMMARY OF INVENTION

Technical Problem

The present invention aims to provide a transparent resin film that enables visual check of an adhesion state thereof when laminated on a picture layer provided on a substrate, a decorative board including the transparent resin film, and a method for producing the decorative board.

Solution to Problem

The present inventors made intensive studies to solve the above problem, and found out that a transparent resin film including an external haze layer on a side that is to be in contact with a picture layer on a substrate enables easy visual check of whether air entrainment occurs when the transparent resin film is laminated on a surface of a picture layer on a substrate. This enables elimination of transparent resin films having poor adhesion to the picture layer due to air entrainment, thereby easily obtaining a transparent resin film excellent in adhesion to the picture layer. Thus, the present invention was completed.

The present invention relates to a transparent resin film for protecting a picture layer provided on one side of a substrate, the transparent resin film comprising at least: a thermoplastic resin layer; and an external haze layer on a picture layer side.

The external haze layer preferably has a haze value of 4% or higher and lower than 100%.

The transparent resin film preferably has a haze value of 90% or lower under the following conditions: a polyethylene terephthalate film having a haze value of 0.1% or lower is attached to an opposite side to the thermoplastic resin layer side of the external haze layer with a pure water layer, and the haze value is measured from the thermoplastic resin layer side in a state where a rear surface of the external haze layer is wet.

The external haze layer preferably has a thickness of 0.5 μm or larger and 20 μm or smaller.

The transparent resin film preferably has a pattern of protrusions and depressions on an opposite side to the picture layer side, the transparent resin film preferably has a haze value (1) of 70% or higher and a haze value (2) of 70% or lower, where the haze value (1) is a value of haze excluding surface haze on an opposite side to the picture layer side and the haze value (2) is a value of haze excluding surface haze on the picture layer side and surface haze on the opposite side to the picture layer side.

The transparent resin film preferably further includes a surface protective layer on an opposite side to the picture layer side of the thermoplastic resin layer.

The present invention also relates to a decorative board comprising: a substrate, a picture layer; and the transparent resin film of the present invention, in a stated order in a thickness direction.

The present invention also relates to a method for producing the decorative board of the present invention, the method including: forming an adhesive layer on a picture layer side of a transparent resin film; and bonding the transparent resin film and the picture layer with the adhesive layer.

Advantageous Effects of Invention

The transparent resin film of the present invention including an external haze layer on a side that is to be in contact with a picture layer on a substrate enables easy visual check of whether air entrainment occurs when the transparent resin film is laminated on a surface of a picture layer on a substrate. This enables elimination of transparent resin films having poor adhesion to the picture layer due to air entrainment, thereby easily obtaining a transparent resin film excellent in adhesion to the picture layer.

The decorative board of the present invention including such a transparent resin film of the present invention laminated on a surface of a picture layer on a substrate easily has a state where no air entrainment occurs between the picture layer and the transparent resin film to easily have excellent adhesion therebetween.

DESCRIPTION OF EMBODIMENTS

<Transparent Resin Film>

A description is given on the transparent resin film of the present invention.

Hereinbelow, the numerical range indicated by "-" means "the lower limit or larger and the upper limit or smaller" (e.g., the range "α-β" refers to the range "α or larger and β or smaller).

A preferred example of the transparent resin film of the present invention is described with reference to drawings.

Figure 1:
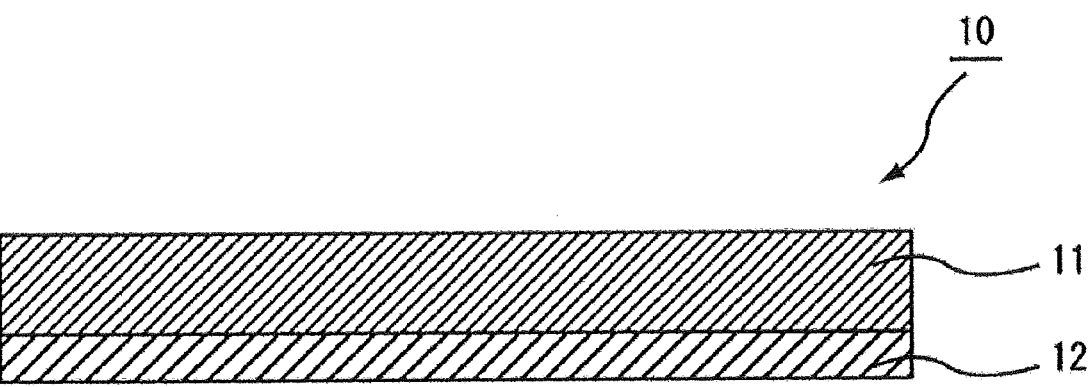
FIG. 1 is a schematic view illustrating a cross section of a preferred example of the transparent resin film of the present invention.

As illustrated in FIG. 1, a transparent resin film 10 of the present invention at least includes a thermoplastic resin layer 11 and an external haze layer 12.

(Thermoplastic Resin Layer)

The thermoplastic resin constituting the thermoplastic resin layer contains one or more of the following resins. Examples of the thermoplastic resin include: olefin resins such as polyethylene (low-density polyethylene, medium-density polyethylene, high-density polyethylene), ethylene-α olefin copolymers, polypropylene, polybutene, polymethylpentene, ethylene-propylene copolymers, propylene-butene copolymers, ethylene-vinyl acetate copolymers, saponified products of ethylene-vinyl acetate copolymers, olefinic thermoplastic elastomers, and mixtures thereof; polyester resins such as polyethylene terephthalate, polybutylene terephthalate, polyethylene naphthalate, ethylene glycol-terephthalic acid-isophthalic acid copolymers, terephthalic acid-ethylene glycol-1,4-cyclohexane dimethanol copolymers, and polyester-based thermoplastic elastomers; acrylic resins such as polymethyl(meth)acrylate, methyl(meth)acrylate-butyl(meth)acrylate copolymers, and methyl(meth)acrylate-styrene copolymers; polyamide-based thermoplastic resins such as Nylon-6 and Nylon-66; polycarbonate resins; polyvinyl chloride; polystyrene; and ionomers. In particular, polypropylene is favorably used as it has high tensile strength, is excellent in chemical resistance, and is advantageous in the production process.

The term "(meth)acrylate" as used herein refers to acrylate or methacrylate.

The thermoplastic resin layer may be unstretched or uniaxially or biaxially stretched, if needed.

The thermoplastic resin layer may have any thickness. The lower limit of the thickness is preferably 20 μm and the upper limit thereof is preferably 500 μm. The lower limit is more preferably 60 μm and the upper limit is more preferably 420 μm.

When the thermoplastic resin layer has a thickness of smaller than 20 μm, the thermoplastic resin layer may have insufficient tensile strength, failing to protect the surface of the picture layer. When the thermoplastic resin layer has a thickness of larger than 500 μm, the transparent resin film of the present invention may have a lower transmittance, resulting in lower visibility of the picture of the picture layer.

The thermoplastic resin layer is not limited as long as a picture layer provided on a substrate is visible, and may be colored. In such a case, a colorant may be added to the non-halogen thermoplastic resin. The colorant may be a pigment or dye used in a picture layer described later.

The thermoplastic resin layer may contain additives such as a filler, a matting agent, a blowing agent, a flame retardant, a lubricant, an antistatic agent, an antioxidant, an ultraviolet absorber, a light stabilizer, a radical scavenger, and a soft component (e.g., rubber).

In the case where the thermoplastic resin layer has a structure including two or more layers, the layers may be laminated with a transparent adhesive layer or thermal laminated.

The layers are preferably thermal laminated because no adhesive is required and troubles due to adhesive deterioration, such as peeling, do not occur.

The thermal lamination may be carried out by a known method such as melt co-extrusion using a T-die.

A known adhesive may be used as the transparent adhesive layer. Examples of the adhesive include polyurethanes, acrylic resins, polyolefins, polyvinyl acetates, polyvinyl chlorides, vinyl chloride-vinyl acetate copolymers, ethylene-acrylic acid copolymers, and ionomers.

The examples further include butadiene-acrylic nitrile rubber, neoprene rubber, and natural rubber. Each of these adhesives may be used alone or in combination of two or more.

The transparent adhesive layer preferably has a dry thickness of about 0.1-30 μm, more preferably about 1-5 μm.

The haze value can be adjusted by rapid cooling after thermal lamination of two or more thermoplastic resin layers.

The rapid cooling herein means cooling of the transparent resin film at a rate of 200° C./sec or higher.

The rapid cooling may be carried out by directly bringing the transparent resin film prepared by thermal lamination into contact with a metal roll cooled to 10° C. or lower for several seconds.

The speed of the rapid cooling is preferably 230° C./sec, more preferably 250° C./sec.

The surface on the external haze layer side (hereafter, also referred to as a rear surface) and the surface on the opposite side (hereafter, also referred to as a front surface) of the thermoplastic resin layer each may be a smooth surface or have a pattern of protrusions and depressions.

When the front surface is a smooth surface, the picture layer provided on one side of a substrate is more clearly visible.

The smooth surface herein refers to a surface having a center line average roughness Ra defined in JIS B 0601 (1982) of 2.0 µm or less.

The "front surface" herein refers to the outermost surface (on the opposite side to the picture layer side) of the transparent resin film. When the transparent resin film includes a surface protective layer described later, the "front surface" refers to the outermost surface on the surface protective layer side.

When the front surface has a pattern of protrusions and depressions, the transparent resin film of the present invention can have a design, leading to more excellent design properties of a decorative board including the transparent resin film of the present invention.

The pattern of protrusions and depressions formed may have any depth. The depth is preferably appropriately adjusted, for example, so that the center line average roughness Ra defined in JIS B 0601 (1982) is within a range of 5-20 µm.

The pattern of protrusions and depressions preferably has a maximum height Rz defined in JIS B 0601(2001) of 20 µm or larger and 200 µm or smaller.

The transparent resin film of the present invention having the pattern of protrusions and depressions can more favorably improve the design properties.

When the maximum height Rz is smaller than 20 µm, the design properties imparted may be insufficient. When the maximum height Rz is larger than 200 µm, the pattern of protrusions and depressions may not be formed readily.

The maximum height Rz is preferably 50 µm or larger and 180 µm or smaller, more preferably 70 µm or larger and 150 µm or smaller.

The center line average roughness Rz defined in JIS B 0601 (1982) and the maximum height Rz defined in JIS B 0601 (2001) herein can be obtained by the measurement with a surface profilometer ("SURFCOM-FLEX-50A" available from Tokyo Seimitsu Co., Ltd.) under the following conditions.

(Measurement Conditions)

Number of measurements: n=5 (at any five points)
Standard for calculation: JIS'01
Measurement type: roughness measurement
Evaluation length: 12.5 mm
Cut-off value: 2.5 mm
Measurement speed: 0.60 mm/s
Filter type: Gaussian filter
Form elimination: straight line
$\lambda$s value: 8.0 µm In the case of a directional pattern of protrusions and depressions such as a wood-grain vessel pattern or a hairline pattern, the measurement is performed in the flow direction and in a direction perpendicular to the flow direction, and the larger measurement value is taken as the maximum height (Rz).

A part where a pattern of protrusions and depressions is provided is selected as the measurement site in the measurement.

The pattern of protrusions and depressions may be formed on the front surface of the thermoplastic resin layer by any method. Examples of the method include thermal embossing and transferring of a pattern of protrusions and depressions to a thermoplastic resin layer using a shape-forming sheet.

Thermal embossing may be performed, for example, using a known sheet- or rotary embosser.

Examples of an embossed pattern include a grain pattern, a hairline pattern, a satin pattern, a wood-grain vessel pattern, a pattern of protrusions and depressions of slab surfaces, a fabric surface texture, and a linear streak pattern.

The embossing may be performed at any temperature, preferably at a temperature that reduces a loss of the roughness pattern, i.e., an embossing return, during molding by thermal press bonding. The pattern of protrusions and depressions may be transferred, for example, at a sheet temperature of 120° C.-160° C. and 1.0-4.0 MPa.

When the transparent resin film is subjected to embossing, it may be performed after or before formation of a surface protective layer described later.

In a specific embodiment 1), for example, after formation of a thermoplastic resin layer, a surface protective layer is formed, followed by embossing. In another specific embodiment 2), after formation of a thermoplastic resin layer, embossing is performed, followed by formation of a surface protective layer. In still another specific embodiment 3), formation of a thermoplastic resin layer and embossing are performed at the same time, followed by formation of a surface protective layer.

(Surface Protective Layer)

Figure 2:
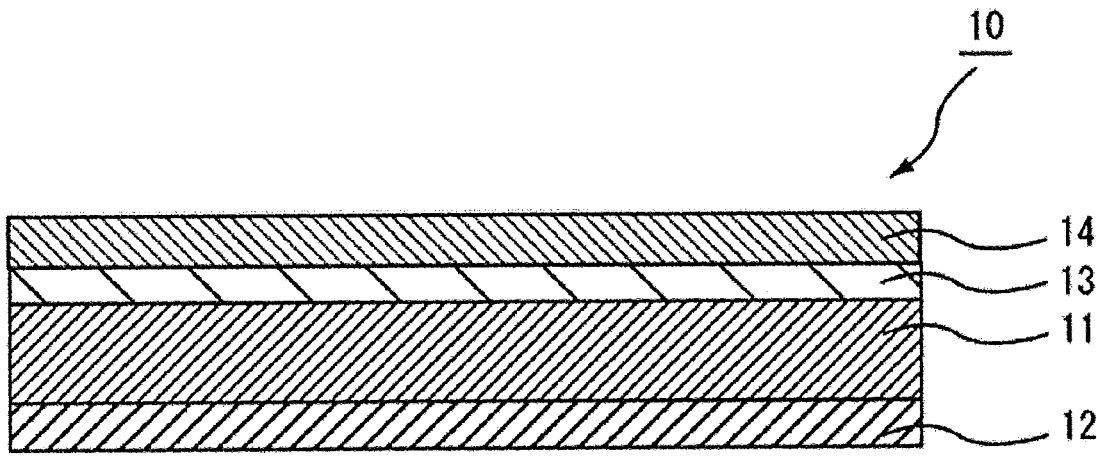
FIG. 2 is a schematic view illustrating a cross section of another preferred example of the transparent resin film of the present invention.

As illustrated in FIG. 2, the transparent resin film 10 of the present invention may further include a surface protective layer 14 provided on a surface on the opposite side to the external haze layer 12 side of the thermoplastic resin layer 11 with a primer layer 13 for a surface protective layer interposed therebetween.

The surface protective layer further improves the durability (e.g., scratch resistance, contamination resistance, weather resistance) of the transparent resin film of the present invention, which enables more favorable protection of the surface of the picture layer, favorably preventing impairment of the design properties due to damage on the transparent resin film itself of the present invention.

The surface protective layer may have a single-layer structure or a multilayer structure including multiple layers formed of the same or different material(s).

Any surface protective layer may be used. Examples thereof include those formed of a crosslink-cured product of a two-component curable resin or ionizing radiation-curable resin composition. The crosslink-cured product is preferably clear, and may be translucent or colored as long as the layer is clear enough to visually recognize the picture layer described later.

Examples of the two-component curable resin include two-component curable urethane resins, two-component curable polyester resins, and two-component curable epoxy resins.

The ionizing radiation-curable resin composition is preferably, for example, an oligomer (including what we call a prepolymer and a macromonomer) having a radical polymerizable unsaturated bond or a cationic polymerizable functional group in the molecule and/or a monomer having a radical polymerizable unsaturated bond or a cationic polymerizable functional group in the molecule. The term "ionizing radiation" herein refers to an electromagnetic wave or charged particle having energy capable of polymerizing or crosslinking molecules. The ionizing radiation is typically an electron beam (EB) or ultraviolet light (UV).

Examples of the oligomer or monomer include compounds having a radical polymerizable unsaturated group (e.g., a (meth)acryloyl group, a (meth)acryloyloxy group) or a cationic polymerizable functional group (e.g., an epoxy group) in the molecule. Each of these oligomers or monomers may be used alone, or two or more thereof may be used in admixture. The term "(meth)acryloyl group" as used herein refers to an acryloyl group or a methacryloyl group.

The oligomer having a radical polymerizable unsaturated group in the molecule is preferably, for example, an oligomer of urethane (meth)acrylate, polyester (meth)acrylate, epoxy (meth)acrylate, melamine (meth)acrylate, or triazine (meth)acrylate, more preferably a urethane (meth)acrylate oligomer. An oligomer having a molecular weight of about 250 to 100000 is typically used.

The monomer having a radical polymerizable unsaturated group in the molecule is preferably, for example, a polyfunctional monomer, more preferably a polyfunctional (meth) acrylate.

Examples of the polyfunctional (meth)acrylate include diethylene glycol di(meth)acrylate, propylene glycol di(meth)acrylate, bisphenol A ethylene oxide-modified di(meth) acrylate, trimethyrolpropane tri(meth)acrylate, trimethylolpropane ethylene oxide tri(meth)acrylate, dipentaerythritol tetra(meth)acrylate, dipentaerythritol penta(meth)acrylate (pentafunctional (meth)acrylate), dipentaerythritol hexa(meth)acrylate (hexafunctional (meth)acrylate). The term "polyfunctional monomer" herein refers to a monomer having multiple radical polymerizable unsaturated groups.

In the present invention, the ionizing radiation-curable resin composition preferably further contains an ionizing radiation-curable resin component containing a urethane acrylate oligomer and a polyfunctional monomer. The ionizing radiation-curable resin component particularly preferably contains a urethane acrylate oligomer and a polyfunctional monomer at a mass ratio (urethane acrylate oligomer/polyfunctional monomer) of 6/4 to 9/1. Within such a mass ratio range, better scratch resistance can be achieved.

If needed, a monofunctional monomer may be appropriately used in addition to the ionizing radiation-curable resin component within a range of the gist of the present invention.

Examples of the monofunctional monomer include methyl(meth)acrylate, 2-ethylhexyl(meth)acrylate, phenoxyethyl (meth)acrylate.

In the case where ultraviolet light is used for crosslinking of the ionizing radiation-curable resin composition, a photopolymerization initiator is preferably added to the ionizing radiation-curable resin composition.

In the case where the ionizing radiation-curable resin composition is a resin system containing a radical polymerizable unsaturated group, the photopolymerization initiator used may be an acetophenone, a benzophenone, a thioxanthone, benzoin, a benzoin methyl ether, or a mixture of these.

In the case where the ionizing radiation-curable resin composition is a resin system containing a cationic polymerizable unsaturated group, the photopolymerization initiator used may be an aromatic diazonium salt, an aromatic sulfonium salt, an aromatic iodonium salt, a metallocene compound, a benzoin sulfonic acid ester, or a mixture of these. The amount of the photopolymerization initiator is about 0.1 to 10 parts by mass per 100 parts by mass of the ionizing radiation-curable resin component.

The ionizing radiation-curable resin composition may further contain additives, if needed. Examples of the additives include thermoplastic resins (e.g., urethane resins, polyvinyl acetal resins, polyester resins, polyolefin resins, styrene resins, polyamide resins, polycarbonate resins, acetal resins, vinyl chloride-vinyl acetate copolymers, vinyl acetate resins, acrylic resins, cellulose resins), lubricants (e.g., silicone resins, wax, fluororesins), ultraviolet absorbers (e.g., benzotriazole, benzophenone), light stabilizers (e.g., hindered amine radical scavengers), and colorants (e.g., dyes, pigments).

The electron beam source for the ionizing radiation used may be, for example, an electron beam accelerator of any type (Cockcroft-Walton type, Van de Graaff type, resonant transformer type, insulating core transformer type, linear type, Dynamitron type, radio frequency type) capable of delivering electrons having an energy of 70-1000 keV. The electron beam dose is preferably, for example, about 1-10 Mrad.

The UV source for the ionizing radiation may be, for example, a light source such as an ultra-high pressure mercury lamp, a high-pressure mercury lamp, a low-pressure mercury lamp, a carbon-arc lamp, a black light, or a metal halide lamp. The ultraviolet light used typically has a wavelength within a range of 190 to 380 nm.

(Primer Layer for Surface Protective Layer)

The primer layer for a surface protective layer preferably contains a binder resin.

The primer layer for a surface protective layer is preferably clear, and may be translucent or colored as long as the layer is clear enough to visually recognize the picture layer.

Examples of the binder resin include urethane resins, acrylic resins, acrylic-urethane resins (acrylic-modified urethane resins), acrylic-urethane copolymer resins (e.g., block copolymers), cellulosic resins, urethane-cellulosic resins (e.g., resin obtained by adding hexamethylene diisocyanate to a mixture of urethane and nitrocellulose), polyester resins, and vinyl chloride-vinyl acetate copolymer resins. In the case where the ionizing radiation-curable resin composition for the surface protective layer described above contains a urethane acrylate oligomer, the binder resin preferably contains a urethane resin from the standpoint of the adhesion to the surface protective layer and production efficiency.

The primer layer for a surface protective layer preferably has a thickness of 0.5 μm or larger and 10 μm or smaller. When the thickness is 0.5 μm or larger, the adhesion of the transparent resin film is favorably ensured. When the thickness is 10 μm or smaller, the transparent resin film of the present invention is not too thick and can have sufficient transparency. Thus, the design properties of the decorative board can be favorably ensured. Also, blocking upon film formation can be reduced.

The term "blocking" refers to a phenomenon that film surfaces stick to each other when the film is wound off from a film roll obtained upon formation of the transparent resin film or application of an adhesion primer. The primer layer for a surface protective layer may further contain inorganic fine particles such as silica particles.

The primer layer for a surface protective layer may contain additives, if needed. Examples of the additives include fillers such as calcium carbonate or clay, flame retardants such as magnesium hydroxide, antioxidants, lubricants, blowing agents, ultraviolet absorbers, and light stabilizers. The amounts of the additives may be appropriately determined in accordance with the product characteristics.

(External Haze Layer)

The transparent resin film of the present invention includes an external haze layer.

The external haze layer is provided on the rear surface of the thermoplastic resin layer for protecting the surface of the picture layer provided on one side of a substrate described later.

In the transparent resin film of the present invention, the external haze layer preferably has a haze value of 4% or higher and lower than 100%. When the haze value is lower than 4%, air entrainment which may occur when the transparent resin film of the present invention is laminated on the surface of the picture layer may not be visually recognized. Also, adhesion may be insufficient. The lower limit of the haze value of the external haze layer is more preferably 5%, still more preferably 6%.

The haze value of the external haze layer is a value obtained by subtracting the haze in a state where the rear surface of the transparent resin film is wet from the haze of the entire transparent resin film.

The haze of the entire transparent resin film can be measured, for example, with a known haze meter by applying light from the front surface side of the external haze layer or the front surface side of the transparent resin film.

The haze in a state where the rear surface is wet can be measured with a known haze meter by applying light from the front surface side of the transparent resin film having a rear surface to which a PET film having a haze value of 0.1% or lower is attached with pure water. Thus, the haze value of the transparent resin film excluding the haze value of the external haze layer can be obtained.

In the transparent resin film of the present invention, the transparent resin film preferably has a haze value of 90% or lower under the following conditions: A polyethylene terephthalate film having a haze value of 0.1% or lower is attached to the opposite side to the thermoplastic resin layer side of the external haze layer with a pure water layer, and the haze value is measured from the thermoplastic resin layer side in a state where the rear surface of the external haze layer was wet.

When the haze value of the transparent resin film having a wet rear surface measured from the thermoplastic resin layer side is higher than 90%, the transparent resin film of the present invention may have lower transparency.

When such a transparent resin film is formed into a decorative board, the visibility of the picture layer may be poor.

The upper limit of the haze value of the transparent resin film having a wet rear surface is more preferably 80%, still more preferably 60%.

The material of the external haze layer is a material used for further improving adhesion to the picture layer. Examples thereof include urethane resins, acrylic resins, urethane-acrylic resins, urethane-acrylic copolymer resins, cellulosic resins, polyester resins, and vinyl chloride-vinyl acetate copolymers.

The external haze layer has a thickness of preferably 0.5 μm or larger and 20 μm or smaller. When the thickness is smaller than 0.5 μm, adhesion between the substrate and the transparent resin film is insufficient. When the thickness is larger than 20 μm, blocking may occur due to contact between the front and rear surfaces of the transparent resin film formed into a roll in production thereof. The lower limit of the thickness of the external haze layer is more preferably 0.8 μm and the upper limit thereof is more preferably 15 μm. The lower limit is still more preferably 1 μm and the upper limit is still more preferably 10 μm.

The haze value in a state where the rear surface is wet is adjusted within the above range, for example, by adjusting the amounts of the additives contained in the thermoplastic resin layer or reducing the thickness of the thermoplastic resin layer.

For further increasing the adhesion strength between the external haze layer and the thermoplastic resin layer, the external haze layer side surface of the thermoplastic resin layer may be subjected to surface treatment such as corona discharge treatment or plasma treatment. The method and conditions of the surface treatment may be determined in accordance with known methods.

For higher adhesion, a primer layer may be formed between the external haze layer and a substrate layer.

The external haze layer may serve as a primer layer for improving adhesion to a substrate layer or the thermoplastic resin layer. The primer layer used is favorably a layer similar to the primer layer for a surface protective layer described above.

The external haze layer may include one or two or more layers similar to the thermoplastic resin layer on a side opposite to the thermoplastic resin layer side.

The external haze layer may contain additives, if needed. Examples of the additives include fillers such as calcium carbonate and clay, flame retardants such as magnesium hydroxide, antioxidants, lubricants, blowing agents, ultraviolet absorbers, and light stabilizers. The amounts of the additives may be appropriately determined in accordance with the product characteristics.

(Haze Value of Transparent Resin Film)

The transparent resin film of the present invention preferably has a value of haze excluding surface haze on an opposite side to the substrate side (hereafter, also referred to as a haze value (1)) of 70% or higher.

The transparent resin film of the present invention having such haze has a higher heat absorption. A pattern of protrusions and depressions is readily formed on such a transparent resin film.

The pattern of protrusions and depressions formed by embossing or the like typically disappears by heat or with the lapse of time. When the haze value (1) is within a predetermined range, such disappearance of the pattern of protrusions and depressions can be suppressed.

The haze value (1) is more preferably 75% or higher, still more preferably 80% or higher.

The haze value as used herein is a value measured with a direct reading haze meter (available from Toyo Seiki Seisakusho, Ltd.).

The haze value (1) can be obtained by the following method.

A transparent resin film, pure water, and a PET film (haze value of 3% or lower) are laminated in the stated order to provide a sheet.

In the lamination, the pure water is laminated on the side having a pattern of protrusions and depressions of the transparent resin film.

The haze value of the obtained sheet is measured from the side having a pattern of protrusions and depressions of the transparent resin film, more specifically from the side of the PET film laminated on the side having a pattern of protrusions and depressions of the transparent resin film with a direct reading haze meter (available from Toyo Seiki Seisakusho, Ltd.). From the obtained haze value, the haze value of the PET film is excluded. Specifically, the haze value (e.g., 3%) of the PET film is subtracted from the obtained haze value. Thus, the haze value (1) is obtained.

The transparent resin film of the present invention preferably has a value of haze excluding surface haze on a substrate side and surface haze on an opposite side to the substrate side (hereafter, also referred to as a haze value (2)) of 70% or lower.

The transparent resin film of the present invention having such haze allows a picture layer described later to be clearly seen, being excellent in design properties.

The haze value (2) is more preferably 65% or lower, still more preferably 60% or lower.

The haze value (2) can be measured by the following method.

A PET film (haze value of 3% or lower), pure water, a transparent resin film, pure water, and a PET film (haze value of 3% or lower) are laminated in the stated order to provide a sheet.

The haze value of the obtained sheet is measured from the side having a pattern of protrusions and depressions of the transparent resin film, more specifically from the side of the PET film laminated on the side having a pattern of protrusions and depressions of the transparent resin film with a direct reading haze meter (available from Toyo Seiki Seisakusho, Ltd.). From the obtained haze value, the haze values of the PET films are excluded. Specifically, the haze values of the PET films (e.g., 3% for each PET film, and 6% in total) are subtracted from the obtained haze value. Thus, the haze value (2) is obtained.

(Method for Producing Transparent Resin Film)

The transparent resin film of the present invention may be produced by any method. Examples of the method include lamination of the above-described layers with the transparent adhesive layer or the primer layer for a surface protective layer and thermal lamination of the above-described layers.

The thermal lamination may be carried out by a known method such as melt co-extrusion using a T-die.

<Decorative Board>

The transparent resin film of the present invention is used for protecting the picture layer. The transparent resin film of the present invention including an external haze layer on a side that is to be in contact with a picture layer on a substrate enables easy visual check of whether air entrainment occurs when the transparent resin film is laminated on a surface of a picture layer on a substrate. Thus, the transparent resin film of the present invention readily has excellent adhesion to the picture layer.

The present invention also encompasses such a decorative board including a substrate, a picture layer, and the transparent resin film of the present invention in the stated order in the thickness direction.

Figure 3:
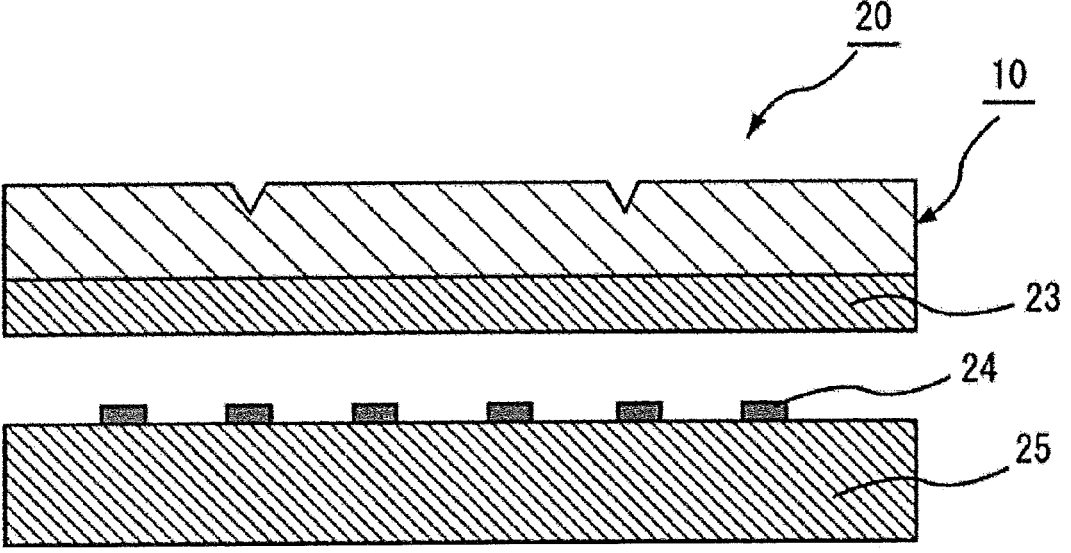
FIG. 3 is a schematic view illustrating a cross section of a preferred example of the decorative board of the present invention.

A preferred example of the decorative board of the present invention is described with reference to FIG. 3.

In a decorative board 20 of the present invention, a picture layer 24 is laminated on one surface of a substrate 25, and a transparent resin film 10 of the present invention is laminated on the opposite side to the substrate 25 side of the picture layer 24.

From the standpoint of further increasing the adhesion strength between the picture layer 24 and the transparent resin film 10 of the present invention, an adhesive layer 23 is preferably provided.

The components of the decorative board of the present invention are described hereinbelow.

(Substrate)

The substrate may be made of any known material such as a resin material, a wood material, or a metal material. The material may also be a composite material of these.

The resin material preferably contains, for example, a thermoplastic resin.

Preferred examples of the thermoplastic resin include: polyvinyl resins such as polyvinyl chloride resins, polyvinyl acetate resins, and polyvinyl alcohol resins; polyolefin resins such as polyethylene, polypropylene, polystyrene, ethylene-vinyl acetate copolymer resins (EVA), and ethylene-(meth) acrylic acid resins; polyester resins such as polyethylene terephthalate resins (PET resins); homopolymers and copolymers of thermoplastic resins such as acrylic resins, polycarbonate resins, polyurethane resins, acrylonitrile-butadiene-styrene copolymer resins (ABS resins), and acrylonitrile-styrene copolymer resins; and resin mixtures of these. In particular, preferred are polyolefin resins, acrylonitrile-butadiene-styrene copolymer resins, polyvinyl chloride resins, and ionomers. The resin material may be foamed.

Examples of the wood material include various materials such as cedar, cypress, zelkova, pine, lauan, teak, and Melapi. The core may be any of sliced veneers, single panels, plywood panels (including LVL), particle boards, medium-density fiberboards (MDF), high-density fiberboards (HDF), and bonded wood made from the above materials and laminated materials prepared by appropriately laminating these.

Examples of the metal material include iron.

The substrate may contain an inorganic compound.

In the case where the substrate is formed of multiple thermoplastic resin layers, the types of the resins forming the multiple thermoplastic resin layers may be the same or different, and the thicknesses of the multiple thermoplastic resin layers may be the same or different.

In the present invention, the substrate may have a hollow structure or partially have a slit or a through hole. Alternatively, the substrate may be in the shape of a frame prepared from the above materials used in combination.

The substrate may have any thickness. The thickness is preferably, for example, 0.01 mm or larger, more preferably 0.1 mm or larger and 50 mm or smaller.

The substrate may have a substantially plate shape other than the flat plate shape, such as one including protrusions and depressions or a curved surface.

(Picture Layer)

A picture layer provided on the substrate is a layer for imparting decorativeness to the decorative board of the present invention including the transparent resin film of the present invention. The picture layer may be, for example, a uniformly colored hiding layer (solid print layer), a design layer formed by printing various patterns using ink and a printer, or a layer combining a hiding layer and a design layer (hereafter, referred to as a pattern layer).

The hiding layer can add an intended color to the substrate which may be stained or colored unevenly, thereby adjusting the color of the surface.

The design layer can provide the decorative board with various patterns such as wood-grain patterns, stone grain patterns imitating the surface of a rock such as marble patterns (e.g., pattern of travertine marble), fabric patterns imitating fabric texture or fabric-like patterns, tiled patterns, brick-masonry patterns, and parquet or patchwork patterns which are combinations of the above patterns. These patterns are formed by typical polychromic printing in process colors including yellow, red, blue, and black, or polychromic printing in spot colors in which plates of individual colors constituting the pattern are used.

The ink composition used for the picture layer is a composition prepared by appropriately mixing a binder resin with a colorant such as a pigment and a dye, an extender pigment, a solvent, a stabilizer, a plasticizer, a catalyst, a curing agent, and the like. Any binder resin may be used.

Preferred examples thereof include urethane resins, vinyl chloride/vinyl acetate copolymer resins, vinyl chloride/vinyl acetate/acrylic copolymer resins, acrylic resins, polyester resins, and nitrocellulose resins. Any of these binder resins may be used alone or in combination of two or more.

Preferred examples of the colorant include: inorganic pigments such as carbon black (Chinese ink), iron black, titanium white, antimony white, chrome yellow, titanium yellow, red iron oxide, cadmium red, ultramarine, and cobalt blue; organic pigments or dyes such as quinacridone red, iso-indolinone yellow, and phthalocyanine blue; metal pigments formed of foil flakes of aluminum, brass, and the like; and pearl-like luster pigments (pearl pigments) formed of foil flakes of titanium dioxide-coated mica, basic lead carbonate, and the like.

The picture layer may have any thickness. The thickness is preferably 0.1 μm or larger, more preferably 0.5 μm or larger and 600 μm or smaller. Having a thickness within the range indicated above, the picture layer can impart an excellent design to the decorative board of the present invention and also can have hiding properties.

In the case where the design of the substrate itself is used as the substrate itself has design properties, such as the case of using sliced veneers, a picture layer may not be provided as the substrate itself serves as a picture layer.

The transparent resin film of the present invention is laminated on the surface of a picture layer provided on one side of a substrate in a manner that the external haze layer is in contact with the picture layer, thereby protecting the surface of the picture layer.

The present invention also encompasses such a decorative board including a substrate, a picture layer, and the transparent resin film of the present invention in the stated order in the thickness direction.

The decorative board of the present invention may have any thickness. The thickness is preferably, for example, 0.05 mm or larger, more preferably 1 mm or larger and 50 mm or smaller.

The decorative board of the present invention may further include a backer layer or the like, if needed. In such a case, an adherend may be provided on a rear side of a transparent adhesive layer, a primer layer, or the backer layer.

The transparent adhesive layer and the primer layer each may be a layer similar to the layer described for the transparent resin film.

(Backer Layer)

Examples of the backer layer include a synthetic resin backer layer and a foamed resin backer layer. The backer layer is preferably provided as the lowermost layer (opposite side to the transparent resin film side) of the substrate.

When the substrate includes the backer layer, the decorative board can have higher scratch resistance and impact resistance.

Examples of the resin contained in the synthetic resin backer layer include polypropylene, ethylene-vinyl alcohol copolymers, polyethylene, polymethylpentene, polyethylene terephthalate, high heat resistant polyalkylene terephthalate (e.g., polyethylene terephthalate obtained by substituting a part of ethylene glycol with 1,4-cyclohexane dimethanol or diethylene glycol, product name: PET-G (available from Eastman Chemical Company)), polybutylene terephthalate, polyethylene naphthalate, polyethylene naphthalate-isophthalate copolymers, amorphous polyester (A-PET), polycarbonate, polyarylate, polyimide, polystyrene, polyamide, and ABS. Each of these resins may be used alone or in combination of two or more.

The synthetic resin backer layer may contain hollow beads.

The type, particle size, and amount of the hollow beads may be those described in JP 2014-188941 A.

The synthetic resin backer layer may have any thickness. For example, the thickness is preferably 100 to 600 μm, more preferably 150 to 450 μm.

Examples of the method for forming the synthetic resin backer layer include calendering and extrusion molding of a melted resin. In particular, extrusion molding of a melted resin is preferred. For example, extrusion molding using a T-die is more preferred.

The foamed resin backer layer may be provided as a layer below the synthetic resin backer layer (opposite side to the side having a pattern of protrusions and depressions).

The foamed resin backer layer may be a layer described in JP 2014-188941 A.

(Support)

The substrate may be a support.

The support is not limited, and may be appropriately selected from various paper materials, plastic films, woody boards such as lumber, and ceramic materials in accordance with the application. Each of these materials may be used alone. Alternatively, any combination of materials may be formed into a laminate, such as a complex of paper materials or a complex of paper materials and plastic films.

Examples of the paper materials include tissue paper, kraft paper, and titanium paper. These paper substrates may contain resins such as acrylic resins, styrene butadiene rubber, melamine resins, or urethane resins (by immersion in a resin after papermaking, or filling upon papermaking) for the purpose of increasing the interfiber strength of the paper substrate or the interlayer strength between the paper substrate and another layer and preventing dusting. Examples thereof include interpaper reinforced paper (Paper with improved binding of cellulose fibers that make up paper) and resin-impregnated paper.

Examples of the paper materials also include various paper materials often used in the building material field such as cotton linter paper, cardboard, base paper for plaster board, and raw webs of vinyl wallpaper that is a paper material provided with a vinyl chloride layer on the surface.

The examples further include those often used in the paperwork field, typical printing, and packaging, such as coated paper, art paper, sulfate paper, glassine paper, parchment paper, paraffin paper, and Japanese paper. Though they are distinguished from these paper materials, woven fabrics or nonwoven fabrics of various fibers having an appearance and characteristics similar to those of paper are also usable as substrates. Examples of the various fibers include inorganic fibers such as glass fiber, asbestos fiber, potassium titanate fiber, alumina fiber, silica fiber, and carbon fiber and synthetic resin fibers such as polyester fiber, acrylic fiber, and vinylon fiber.

In the case where the paper materials are impregnated with thermosetting resins, conventionally known thermosetting resins are widely usable. Examples of the thermosetting resins include unsaturated polyester resins, polyurethane resins (including two-component curable polyurethanes), epoxy resins, aminoalkyd resins, phenolic resins, urea resins, diallylphthalate resins, melamine resins, guanamine resins, melamine-urea cocondensated resins, silicon resins, and polysiloxane resins.

A layer obtained by impregnating a paper material with a thermosetting resin is also referred to as a thermosetting resin layer. In some cases, the thermosetting resin finally serves as a surface protective layer.

In the case where the support includes a porous substrate, for example, the thermosetting resin layer may be formed by impregnating the porous substrate with any of the thermosetting resins.

Impregnation can be carried out by supplying any of the thermosetting resins to the porous substrate from one or both of the front and rear sides of the porous substrate. The impregnation method is not limited, and examples thereof include: immersion of the mold release layer side surface or the opposite side surface of the porous substrate in a thermosetting resin bath; application of a thermosetting resin to the mold release layer side surface, the opposite side surface, or both surfaces of the porous substrate using a coater such as a kiss coater or comma coater; and spraying of a thermosetting resin to the mold release layer side surface, the opposite side surface, or both surfaces of the porous substrate by a spray coater or a shower coater.

Specific examples of the resins contained in the plastic films include polyolefin resins (e.g., polyethylene, polypropylene), vinyl resins (e.g., vinyl chloride resins, vinylidene chloride resins, phenolic resins, polyvinyl alcohol, ethylene-vinyl alcohol copolymers), polyester resins (e.g., polyethylene terephthalate, polybutylene terephthalate), acrylic resins (e.g., polymethyl methacrylate, polymethyl acrylate, polyethyl methacrylate), polystyrene, acrylonitrile-butadiene-styrene copolymers (ABS resins), cellulose triacetate, and polycarbonate. Among these, preferred are polyolefin resins, vinyl chloride resins, polyester resins, and acrylic resins from the standpoint of physical properties such as weather resistance and water resistance, printability, molding processability, and cost.

The support may have any thickness. In the case where the support is a plastic film, the thickness is preferably 20-200 μm, more preferably 40-160 μm, still more preferably 40-100 μm.

In the case where the support is a paper material, the basis weight is typically preferably 20-150 g/m², more preferably 30-100 g/m².

The shape of the support is not limited to a flat plate shape, and may be a special shape such as a three-dimensional shape.

For the purpose of improving adhesion between the support and a layer provided on the support, one surface or both surfaces of the support may be subjected to adhesion enhancing treatment such as physical treatment or chemical surface treatment.

(Phenolic Resin Impregnated Paper)

The decorative board may include a phenolic resin impregnated paper, if needed.

The phenolic resin impregnated paper is preferably provided on the surface on the opposite side to the abrasion resistance layer/mold release layer side of the porous substrate.

The phenolic resin impregnated paper is typically produced by impregnating kraft paper having a basis weight of about 150-250 g/m², as core paper, with a phenolic resin to a degree of impregnation of about 45-60% and drying the resulting paper at about 100-140° C. The phenolic resin impregnated paper used may be a commercial product. In the case of using a phenolic resin impregnated paper, the rear surface of the porous substrate may be subjected to corona discharge treatment or a rear primer layer may be formed by applying the primer layer described above on the rear surface of the porous substrate, if needed.

(Sealer Layer)

In the case where the support is a substrate having impregnation properties such as a paper material, a sealer layer may be provided between the support and the picture layer.

The sealer layer preferably contains a cured product of a thermosetting resin composition or an ionization radiation-curable resin composition, more preferably a cured product of a thermosetting resin composition.

The amount of the cured product of the curable resin composition in the total solid content of the sealer layer is preferably 50% by mass or more, more preferably 65-95% by mass.

Examples of the thermosetting resin composition and the ionizing radiation-curable resin composition for the sealer layer include those exemplified for the surface protective layer. The thermosetting resin composition is preferably a two-component curable resin containing a polyol and an isocyanate, more preferably a two-component curable resin containing an acrylic polyol and hexamethylene diisocyanate.

The sealer layer preferably contains particles from the standpoint of drying suitability and viscosity adjustment. The amount of the particles in the total solid content of the sealer layer is preferably 5-50% by mass, more preferably 5-35% by mass.

The particles in the sealer layer are preferably inorganic particles. Among the inorganic particles, silica particles are preferred.

The particles preferably have an average particle size of 0.1-2.0 μm, more preferably 0.2-1.5 μm.

<Adherend>

The decorative board of the present invention may be laminated to an adherend in a manner that the surface on the opposite side to the side having a pattern of protrusions and depressions is in contact with the adherend.

In the case where an adherend including the picture layer is used, the decorative board of the present invention can be obtained by providing the transparent resin film on the adherend having the picture layer.

The picture layer is preferably the picture layer described above.

Examples of the material of the adherend include wood sheets such as wood single panels, plywood panels, particle boards, and medium-density fiberboards (MDF); plaster-based sheets such as plaster sheets and plaster slab sheets; cement sheets such as calcium silicate sheets, asbestos slate sheets, cellular lightweight concrete sheets, and hollow extruded cement sheets; fiber cement sheets such as pulp cement sheets, asbestos cement sheets, and wood chip cement sheets; ceramic sheets such as pottery sheets, porcelain sheets, earthenware sheets, glass sheets, and enamel sheets; metallic sheets such as iron sheets, galvanized steel sheets, polyvinyl chloride sol-coated steel sheets, aluminum sheets, and copper sheets; thermoplastic resin sheets such as polyolefin resin sheets, acrylic resin sheets, ABS sheets, and polycarbonate sheets; thermosetting resin sheets such as phenolic resin sheets, urea resin sheets, unsaturated polyester resin sheets, polyurethane resin sheets, epoxy resin sheets, and melamine resin sheets; and complex materials obtained by curing various fiber substrates (e.g., glass fiber nonwoven fabric, woven fabric, paper) impregnated with resins (e.g., phenolic resins, urea resins, unsaturated polyester resins, polyurethane resins, epoxy resins, melamine resins, diallylphthalate resins), i.e., FRP sheets. Each of these materials may be used alone as a substrate or two or more of these may be laminated to be used as a complex substrate.

The adherend may have any thickness.

Lamination to the adherend may be carried out by any method. Examples of the method include lamination using the primer layer described above or lamination using an adhesive.

The adhesive may be appropriately selected from known additives in accordance with the type of the adherend or the like. Examples of the adhesive include polyvinyl acetate, urethane resins, acrylic resins, urethane-acrylic resins (including copolymers), polyvinyl chloride, vinyl chloride-vinyl acetate copolymers, ethylene-acrylic acid copolymers, and ionomers. The examples further include butadiene-acrylonitrile rubber, neoprene rubber, and natural rubber.

<Method for Producing Decorative Board>

The decorative board of the present invention may be produced by lamination of the substrate, the picture layer, and the transparent resin film, for example, by heat melting or thermal lamination or using an adhesive such as an aqueous adhesive, a thermosensitive adhesive, a pressure-sensitive adhesive, a hotmelt adhesive, or an adhesive forming the transparent adhesive layer described above.

In particular, the method for producing the decorative board preferably includes: forming an adhesive layer on the picture layer side surface of the transparent resin film; and bonding the transparent resin film and the picture layer with the adhesive layer.

The present invention also encompasses such a method for producing the decorative board of the present invention.

In the case of the transparent resin film, the pattern of protrusions and depressions is formed on the opposite side to the picture layer side by embossing or the like. At this time, a bit of a pattern of protrusions and depressions corresponding to the pattern of protrusions and depressions on the embossed side is unintendedly formed on the surface on the opposite side (picture layer side) to the surface subjected to embossing. In such a case, air entrainment, i.e., a phenomenon that air enters into the pattern of protrusions and depressions on the picture layer side of the transparent resin film, may occur to lower the design properties.

Since the method for producing the decorative board of the present invention includes a step of forming an adhesive layer on the picture layer side surface of the transparent resin film, the adhesive layer is provided even at a depression of the pattern of protrusions and depressions on the picture layer side, the air entrainment can be prevented, thereby suppressing impairment of the design properties.

EXAMPLES

The present invention is more specifically described with reference to, but not limited to, examples hereinbelow.

Example 1

To one surface of a transparent polypropylene film (thickness of 60 μm) was applied a silica-containing two-component curable urethane resin (thickness of 1 μm) containing isocyanate as a curing agent. Thus, a primer layer for a surface protective layer was formed.

To the other surface of the transparent polypropylene film (opposite side to the primer layer for a surface protective layer side) was extruded and thermal laminated a transparent polypropylene resin (thickness of 200 μm). The surface was subjected to corona treatment. To the treated surface was applied a two-component curable urethane resin (thickness of 2 μm) containing isocyanate as a curing agent. Thus, an external haze layer was formed. To the primer layer for a surface protective layer side surface was applied by gravure coating urethane (meth)acrylate that is an electron beam-curable resin in an amount of 15 μm. The applied resin was irradiated with an electron beam using an electron irradiation device at an accelerating voltage of 165 keV and 5 Mrad, thereby forming a surface protective layer. Then, the surface protective layer side surface was brought into contact with an embossing plate for heat-absorbing embossing, thereby forming a pattern of protrusions and depressions. Thus, a transparent resin film was produced.

The haze value of the entire transparent resin film and the haze value in a state where a rear surface was wet were measured with a haze mater by the method described later.

Separately, a HDF (thickness of 3 mm) was provided. On one surface of the HDF was formed a picture layer having a thickness of 2 μm using an inkjet printer. Thus, a substrate was provided.

To the surface on the opposite side to the side having a pattern of protrusions and depressions of the obtained transparent resin film was applied a two-component curable polyester resin (thickness of 50 μm) containing isocyanate as a curing agent, thereby forming an adhesive layer. The obtained transparent resin film and the substrate were laminated with the adhesive layer in a manner that the surface on the opposite side to the side having a pattern of protrusions and depressions of the transparent resin film faces the picture layer side surface of the substrate. The laminate was allowed to stand in a room-temperature environment under a pressure of 10 kg/m² for three days.

(Haze Value Measuring Method)

A measuring device used was a direct haze meter (available from Toyo Seiki Seisakusho, Ltd.).

Haze value of entire sheet: The haze value was measured under application of light from the side having a pattern of protrusions and depressions of the transparent resin film, specifically, from the side of the surface protective layer on which a pattern of protrusions and depressions was formed in Example 1.

Haze value in a state where the rear surface was wet: To the external haze layer side of the transparent resin film was dropwise added pure water, and a PET film (Lumirror T60 available from TORAY Industries, Inc., thickness of 50 μm, haze value of 0.1%) was laminated thereto in a manner that air does not enter therebetween. The haze value in such a state was measured under application of light from the side having a pattern of protrusions and depressions of the transparent resin film, specifically, from the side of the surface protective layer on which a pattern of protrusions and depressions was formed in Example 1.

Haze value of external haze layer: The haze value was calculated by subtracting the haze value in a state where the rear surface was wet from the haze value of the entire sheet.

(Visual Check of Air Entrainment)

++: Presence of air entrainment was clearly recognizable.

+: Presence of air entrainment was recognizable under oblique light.

−: Presence of air entrainment was not recognizable.

(Design Properties after Lamination)

+++: Design was visible clearly after lamination.

++: Design seemed slightly blurred after lamination.

+: Design seemed remarkably blurred after lamination.

−: Design was hardly visible after lamination.

Examples 2 to 4, Reference Example 1

A transparent resin film was produced as in Example 1, except that the sample used included an external haze layer having a different haze value as shown in Table 1. The obtained transparent resin film was evaluated in the same manner as in Example 1.

TABLE 1

| | Example 1 | Example 2 | Example 3 | Example 4 | Reference Example 1 |
|---|---|---|---|---|---|
| Haze value of external haze layer (%) | 4.1 | 9.8 | 7.6 | 14.3 | 3.9 |
| Haze value of entire sheet (%) | 86.5 | 87.8 | 59.8 | 76.8 | 90.9 |
| Total light transmittance in measurement of haze value of entire sheet (%) | 81.5 | 79.1 | 89.5 | 86.9 | 78.6 |
| Haze value in a state where rear surface is wet (%) | 82.4 | 78.0 | 52.2 | 62.5 | 87.0 |
| Total light transmittance in measurement of haze value in a state where rear surface is wet (%) | 87.6 | 87.0 | 87.3 | 86.0 | 87.2 |
| Visual check of air entrainment | + | ++ | ++ | ++ | − |
| Design properties after lamination | + | ++ | +++ | ++ | + |

The presence of air entrainment was visually recognizable in the transparent resin films obtained in Examples 1 to 4.

In contrast, the presence of air entrainment was not visually recognizable in the transparent resin film obtained in Reference Example 1.

Example 5

A polypropylene resin (thickness of 60 μm) was provided. To one surface (on the side to be in contact with a substrate having a picture layer) thereof was applied a primer agent to form an external haze layer (thickness of 2 μm, two-component curable urethane resin containing isocyanate as a curing agent). To the other surface of the polypropylene resin was extruded and thermal laminated a polypropylene resin (thickness of 60 μm). Then, the laminate was directly brought into contact with a metallic roll maintained at a temperature of 10° C. for 0.5 seconds to be cooled (rapidly) at a rate of 200° C./sec. Thus, a transparent resin layer including an external haze layer was obtained.

Next, the surface on the opposite side to the external haze layer side of the transparent resin layer was subjected to corona treatment. To the treated surface was applied a primer agent (thickness of 2 μm) to form a primer layer for a surface protective layer. To the surface of the primer layer for a surface protective layer was applied by gravure coating an ionizing radiation-curable resin (application amount of 15 μm). The applied resin was irradiated with an electron beam using an electron irradiation device under the conditions of an accelerating voltage of 165 keV and 5 Mrad. Thus, a surface protective layer was formed.

After heating of the surface protective layer side with a contactless infrared heater, the surface was subjected to hot press embossing. Thus, a transparent resin film having a pattern of protrusions and depressions was obtained.

To the external haze layer side surface of the transparent resin film was applied a two-component curable polyester (thickness of 50 μm) to form an adhesive layer, and the transparent resin film was laminated to a substrate (medium density fiberboard (MDF) having a thickness of 3 mm)

including a picture layer having a thickness of 2 μm formed with an inkjet printer. Thus, a decorative board was obtained.

Example 6

A decorative board was produced as in Example 5, except that the thickness of the external haze layer was changed to 1 μm.

Example 7

A decorative board was produced as in Example 5, except that the thickness of the external haze layer was changed to 5 μm.

Reference Example 2

A decorative board was produced as in Example 5, except that the thickness of the external haze layer was changed to 0.5 μm.

Reference Example 3

A polypropylene resin (thickness of 60 μm) was provided. To one surface thereof was applied a primer agent (thickness of 2 μm, two-component curable urethane resin containing isocyanate as a curing agent) to form an external haze layer. To the other surface of the polypropylene resin was extruded and thermal laminated a polypropylene resin (thickness of 60 μm). Then, the laminate was directly brought into contact with a metallic roll maintained at a temperature of 50° C. for 0.5 seconds, left in an environment at 25° C., and further cooled (slowly) at a rate of 50° C./sec. Thus, a transparent resin layer including an external haze layer was obtained.

A decorative board was produced as in Example 5 except for the above process.

<Haze Value>

For the transparent resin films obtained in Examples 5 to 7 and Reference Examples 2 to 3, the haze value (1) and the haze value (2) were measured by the following method. The haze value (1) refers to a value of haze excluding surface haze on the opposite side to the side to be in contact with the substrate. The haze value (2) refers to a value of haze excluding surface haze on the side to be in contact with the substrate and surface haze on the opposite side to the side to be in contact with the substrate.

<Haze Value (1)>

A sheet including a transparent resin film, pure water, and a PET film (Lumirror T60 available from TORAY Industries, Inc., thickness of 100 μm, haze value of 1.5%) in the stated order was produced.

In the production, the pure water was made in contact with the side having a pattern of protrusions and depressions of the transparent resin film.

The haze value of the obtained sheet was measured with a direct reading haze meter (available from Toyo Seiki Seisakusho, Ltd.) from the side having a pattern of protrusions and depressions of the transparent resin film, more specifically from the side of the PET film provided on the side having a pattern of protrusions and depressions of the transparent resin film. The haze value (1) was obtained by subtracting the haze value of the PET film, specifically 1.5%, from the measured haze value.

<Haze Value (2)>

A sheet including a PET film (Lumirror T60 available from TORAY Industries, Inc., thickness of 100 μm, haze value of 1.5%), pure water, a transparent resin film, pure water, and a PET film (Lumirror T60 available from TORAY Industries, Inc., thickness of 100 μm, haze value of 1.5%) in the stated order was produced.

The haze value of the obtained sheet was measured with a direct reading haze meter (available from Toyo Seiki Seisakusho, Ltd) from the side having a pattern of protrusions and depressions of the transparent resin film, more specifically from the side of the PET film provided on the side having a pattern of protrusions and depressions of the transparent resin film. The haze value (2) was obtained by subtracting the haze values of the PET films, specifically 1.5% for each and 3% in total, from the measured haze value.

(Pattern Retention of Protrusions and Depressions)

For the transparent resin films obtained in Examples 5-7 and Reference Examples 2-3, the gloss value ($G_A$) on the side having a pattern of protrusions and depressions (surface protective layer side) was measured.

Next, the transparent resin film was immersed in glycerol at 100° C. for 30 seconds, and cooled with cold water. Then, the gloss value ($G_B$) was again measured on the side having a pattern of protrusions and depressions.

The ease of forming a pattern of protrusions and depressions was evaluated based on the following criteria. A smaller difference in the gloss values ($G_A$) and ($G_B$) indicates a smaller loss of the pattern of protrusions and depressions.

A gloss meter (GMX-202 (angle of 60°) available from Murakami Color Research Laboratory) was used for the measurement of the gloss values. The measurement was in conformity with JIS Z8741.

++: ($G_B$)/($G_A$) was 80% or higher.
+: ($G_B$)/($G_A$) was 60% or higher and lower than 80%.
−: ($G_B$)/($G_A$) was lower than 60%.

(Design Properties)

The decorative boards obtained in Examples 5-7 and Reference Examples 2-3 were visually observed and evaluated based on the following criteria.

++: The printed pattern on the picture layer was visible clearly.
+: The printed pattern on the picture layer seemed slightly discolored (blurred).
−: The printed pattern on the picture layer was not visible clearly.

TABLE 2

| | Example 5 | Example 6 | Example 7 | Reference Example 2 | Reference Example 3 |
|---|---|---|---|---|---|
| Cooling method | Rapid cooling | Rapid cooling | Rapid cooling | Rapid cooling | Slow cooling |
| Thickness of external haze layer (μm) | 2 | 1 | 5 | 0.5 | 2 |
| Haze value (1) (%) | 82 | 75 | 86 | 68 | 89 |
| Haze value (2) (%) | 59 | 52 | 66 | 49 | 73 |
| Ease of forming pattern of protrusions and depressions | ++ | + | ++ | − | ++ |
| Design properties | ++ | ++ | + | ++ | − |

The transparent resin films obtained in Examples 5-7 were confirmed to be excellent in ease of forming a pattern of protrusions and depressions. The decorative boards obtained in the examples were confirmed to be excellent in design properties.

In contrast, Reference Example 2 having a haze value (1) of lower than 70% was poor in ease of forming a pattern of protrusions and depressions. Reference Example 3 having a haze value (2) of higher than 70% had poor design properties.

INDUSTRIAL APPLICABILITY

The present invention can provide a transparent resin film that enables visual check of whether or not the transparent resin film adheres to a picture layer on a substrate. The decorative board of the present invention is favorably used for fittings, doors (e.g., sliding doors), floor materials, walls, and ceilings which are interior building materials, and various decorative molded articles.

REFERENCE SIGNS LIST

10: transparent resin film of the present invention
11: thermoplastic resin layer
12: external haze layer
13: primer layer for surface protective layer
14: surface protective layer
20: decorative board
23: adhesive layer
24: picture layer
25: substrate

The invention claimed is:

1. A transparent resin film for protecting a picture layer provided on one side of a substrate,
the transparent resin film comprising at least: a thermoplastic resin layer; and an external haze layer on a picture layer side,
the transparent resin film having a haze value of 90% or lower under the following conditions: A polyethylene terephthalate film having a haze value of 0.1% or lower is attached to an opposite side to the thermoplastic resin layer side of the external haze layer with a pure water layer, and the haze value is measured from the thermoplastic resin layer side in a state where a rear surface of the external haze layer is wet,
the external haze layer having a thickness of 0.5 μm or larger and 20 μm or smaller,
the transparent resin film having a pattern of protrusions and depressions on an opposite side to the picture layer side, and
the thermoplastic resin layer having a thickness of 60 μm or larger and 500 μm or smaller.

2. The transparent resin film according to claim 1, wherein the external haze layer has a haze value of 4% or higher and lower than 100%.

3. The transparent resin film according to claim 1, further comprising a surface protective layer on an opposite side to the picture layer side of the thermoplastic resin layer.

4. The transparent resin film according to claim 2, further comprising a surface protective layer on an opposite side to the picture layer side of the thermoplastic resin layer.

5. The transparent resin film according to claim 1, wherein the external haze layer consists of at least one resin selected from the group consisting of urethane resins, acrylic resins, urethane-acrylic resins, urethane-acrylic copolymer resins, cellulosic resins, polyester resins, and vinyl chloride-vinyl acetate copolymers.

6. A decorative board comprising:

a substrate;

a picture layer; and the transparent resin film according to claim 1, in a stated order in a thickness direction.

7. A method for producing the decorative board according to claim 6, the method comprising:

forming an adhesive layer on a picture layer side of a transparent resin film; and bonding the transparent resin film and the picture layer with the adhesive layer.

8. A decorative board comprising:

a substrate;

a picture layer; and the transparent resin film according to claim 2, in a stated order in a thickness direction.

9. A decorative board comprising:

a substrate;

a picture layer; and the transparent resin film according to claim 6, in a stated order in a thickness direction.

10. A transparent resin film for protecting a picture layer provided on one side of a substrate, the transparent resin film comprising at least: a thermoplastic resin layer; and an external haze layer on a picture layer side, the transparent resin film having a pattern of protrusions and depressions on an opposite side to the picture layer side, and the transparent resin film having a haze value (1) of 70% or higher and a haze value (2) of 70% or lower, where the haze value (1) is a value of haze excluding surface haze on an opposite side to the picture layer side, and the haze value (2) is a value of haze excluding surface haze on the picture layer side and surface haze on the opposite side to the picture layer side.

11. The transparent resin film according to claim 10, further comprising a surface protective layer on an opposite side to the picture layer side of the thermoplastic resin layer.

12. A decorative board comprising:

a substrate;

a picture layer; and the transparent resin film according to claim 5, in a stated order in a thickness direction.

\* \* \* \* \*